United States Patent
Hansmann et al.

(10) Patent No.: US 9,125,059 B2
(45) Date of Patent: Sep. 1, 2015

(54) PASSWORD-FREE, TOKEN-BASED WIRELESS ACCESS

(71) Applicant: INTERNATIONAL BUSINESS MACHINES CORPORATION, Armonk, NY (US)

(72) Inventors: Uwe Hansmann, Tuebingen (DE); Klaus Rindtorff, Weil Im Schoenbuch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/023,872

(22) Filed: Sep. 11, 2013

(65) Prior Publication Data

US 2014/0137206 A1 May 15, 2014

(30) Foreign Application Priority Data

Nov. 14, 2012 (GB) .................................. 1220441.8

(51) Int. Cl.
*H04W 12/08* (2009.01)
*H04W 12/04* (2009.01)
*H04L 29/06* (2006.01)
*H04W 84/12* (2009.01)

(52) U.S. Cl.
CPC .............. *H04W 12/08* (2013.01); *H04W 12/04* (2013.01); *H04L 63/068* (2013.01); *H04L 63/0846* (2013.01); *H04L 63/166* (2013.01); *H04W 84/12* (2013.01)

(58) Field of Classification Search
CPC ..... H04W 12/08; H04W 12/04; H04W 84/12; G06Q 30/0224; G06Q 30/0267; H04L 63/01; H04L 63/068; H04L 63/0846; H04L 63/166

USPC ............................................................. 726/4
See application file for complete search history.

(56) References Cited

U.S. PATENT DOCUMENTS

| | | |
|---|---|---|
| 5,594,731 A | 1/1997 | Reissner |
| 5,875,296 A | 2/1999 | Shi et al. |
| 5,943,423 A | 8/1999 | Muftic |
| 6,041,357 A | 3/2000 | Kunzelman et al. |

(Continued)

OTHER PUBLICATIONS

GB Patent Application No. GB1220441.8—Search Report and Examination Opinion Mailed May 30, 2013.

(Continued)

*Primary Examiner* — Kambiz Zand
*Assistant Examiner* — Abiy Getachew
(74) *Attorney, Agent, or Firm* — Law Office of Jim Boice (57) ABSTRACT

A method, system, and/or computer program product establish a password-free, token-based wireless network access for a mobile device that is within a wireless communication range of a wireless access point. A wireless connection is established between the mobile device and the wireless access point, where the wireless connection utilizes an extended existing protocol, and where the extension of the existing protocol is based on data stored as content in a data field in a token stored in a memory of the mobile device. The mobile device transmits a portion of the token as part of an initialization message to a verification server that is connected to the wireless access point. The mobile device receives a confirmation message for establishing the wireless connection based on a verification application running on the verification server.

20 Claims, 6 Drawing Sheets

(56) References Cited

U.S. PATENT DOCUMENTS

| | | |
|---|---|---|
| 7,054,627 B1 | 5/2006 | Hillman |
| 7,548,744 B2 | 6/2009 | Oesterling et al. |
| 7,702,794 B1 | 4/2010 | Hall et al. |
| 8,745,401 B1 * | 6/2014 | Hintz et al. ............... 713/176 |
| 2001/0048744 A1 | 12/2001 | Kimura |
| 2006/0023882 A1 | 2/2006 | Salkintzis |
| 2006/0104224 A1 | 5/2006 | Singh et al. |
| 2007/0206526 A1 | 9/2007 | Sebban |
| 2011/0197267 A1 * | 8/2011 | Gravel et al. .................. 726/5 |
| 2012/0147777 A1 | 6/2012 | Arashin et al. |
| 2012/0166618 A1 | 6/2012 | Dahod et al. |
| 2013/0041831 A1 * | 2/2013 | Das .............................. 705/72 |
| 2013/0237148 A1 * | 9/2013 | McCann et al. ............ 455/41.1 |

OTHER PUBLICATIONS

Institute of Electrical and Electronics Engineers, Inc., "802.11i IEEE Standard; Part 11: Wireless LAN Medium Access Control (MAC) and Physical Layer (PHY) Specifications; Amendment 6: Medium Access Control (MAC) Security Enhancements", IEEE Computer Society, New York, NY, Jul. 23, 2004, pp. 1-3.

Cisco, "The Future of Hotspots: Making Wi-Fi As Secure and Easy to Use As Cellular", White Paper, Cisco, 2012, pp. 1-9.

Anonymous, "Transport Layer Security (TLS)" Etutorials.Org, Retrieved Jul. 31, 2013, pp. 1-12.

B. Aboba et al., "The Network Access Identifier", Network Working Group, The Internet Society, Internet Engineering Task Force, Dec. 2005, pp. 1-15.

* cited by examiner 100 method of password-free, token-based network access 102 using an extended protocol 104 sending a portion of content of a token 106 receiving a confirmation message 108 receiving information object and transform into human recognizable form

PASSWORD-FREE, TOKEN-BASED WIRELESS ACCESS

This application is based on and claims the benefit of priority from United Kingdom (GB) Patent Application No. 1220441.8, filed on Nov. 14, 2012, and herein incorporated by reference in its entirety.

BACKGROUND

The present invention relates generally to a computer-implemented method for a password-free, token-based wireless network access. The invention relates further to a mobile device subsystem for a password-free, token-based wireless network access, a mobile device, a data processing program, and a computer program product.

Today's smart phones are capable of accessing the Internet and browsing content available there. They need an IP (Internet Protocol) connection which typically is provided either via the mobile phone network provider or via a local WiFi (Wireless Fidelity, IEEE 802.11) network that also has Internet access. When using a mobile phone network provider connection without a flat rate, high connection costs are typically incurred. Access via a local WiFi network, however, is typically free of charge if the mobile device can be authenticated to the WiFi network. This is because an access point Internet backend connection is using most often a flat rate connection to the Internet. For that reason, when within the reach of a WiFi network owned by the user of the device, the device typically is configured to prefer the WiFi based Internet connection over the mobile phone network provider based Internet connection. This becomes particularly cost reducing in scenarios when the UMTS or mobile network connection would require the user to pay roaming costs, e.g., in another country or in an area with no coverage by a contracted network provider.

While outside the reach of the user's own WiFi access point (e.g., at home), the mobile device either has to find another accessible WiFi access point or revert to using the mobile phone network provider based Internet connection. When within the reach of WiFi access points owned by other users, typically, there is no incentive for those other users to provide service from their access points to foreign devices. However, if acceptable terms and conditions can be established between the access point and the mobile device, an incentive to provide Internet access to foreign devices may arise.

SUMMARY

A method, system, and/or computer program product establish a password-free, token-based wireless network access for a mobile device that is within a wireless communication range of a wireless access point. A wireless connection is established between the mobile device and the wireless access point, where the wireless connection utilizes an extended existing protocol, and where the extension of the existing protocol is based on data stored as content in a data field in a token stored in a memory of the mobile device. The mobile device transmits a portion of the token as part of an initialization message to a verification server that is connected to the wireless access point. The mobile device receives a confirmation message for establishing the wireless connection based on a verification application running on the verification server.

BRIEF DESCRIPTION OF THE SEVERAL VIEWS OF THE DRAWINGS

Illustrative embodiments of the invention will now be described, by way of example only, and with reference to the following drawings.

DETAILED DESCRIPTION

Today, there are several ways to gain access at a wireless hotspot or wireless access point that can provide Internet connectivity, typically using a wireless connection, i.e., via WiFi. Such access may be fee based: after connecting to the access point and opening a browser window, the access point may present a web page that requires the user to enter (for example) credit card data or another form of payment data. This scenario has the clear disadvantage that the user may have to pay for the service and that a user may have to go through at least one additional, manual step for exchanging authentication data prior to gaining Internet access.

On the other side, the access may be free: in this case, the user may connect to an un-secure access point and may get access to the Internet. In some cases, the user may have to agree manually to some terms and conditions or rules before a connection to the Internet may be established. This scenario has the disadvantage for the access point owner that he is not getting anything in direct return for his service.

There are several known methods related to a wireless network access with some additional conditions. For example, one known method for opening a wireless communication session uses at least a management platform, a wireless access point and an end user station. Content may be associated with at least a wireless access point at the management platform level and advertising may be displayed before a user logs into the wireless network. Another known method uses a system and a method to secure authentication of a wireless communication channel for a vehicle telematics device that includes detecting a wireless access point within radio range of a telematics device. It comprises requesting authentication information for the access point through a first secure communication channel to a call center, receiving authentication information for the wireless access point from the call center through the first secure communication channel, and providing authentication information for the telematics device to the wireless access point through a second secure communication channel.

However, there may be a need for an even easier and more user friendly access to a WiFi network. The technologies described in this document aim at providing such a hassle-free access to a network, e.g., the Internet, via a WiFi access point.

This need may be addressed by a computer-implemented method for a password-free, token-based wireless network access, a mobile device subsystem for a password-free, token-based wireless network access, a mobile device, a data processing program, and a computer program product according to the independent claims.

It may be noted that the mobile device may be, for example, a smart device, a smart phone, a tablet computer, a notebook computer, an ultra-book computer, a portable game console, a WiFi enabled camera system, data goggles used in virtual reality applications, an in-car communication system, or any other device enabled for WiFi access. And the mobile device may be operated by an operator or user.

The wireless network access may either be adapted to access resources attached to the network or it may allow a transparent across access to a public network, e.g., the Internet.

In the context of this description, the following conventions, terms and/or expressions may be used:

The term "wireless network access" may denote the process of establishing a communication link from a mobile device equipped with a transmitter to another device with another transmitter which may be connected to a network with attached resources. The network may be a wire-based, or a wireless network, or a mixture of both. The device, e.g., a mobile device, may thus be granted access to the network, e.g., the Internet, while still being mobile.

The term "mobile device" may denote any device that may be moved from one place to another. The mobile device may be equipped with a transmitter allowing a wireless network access. Current examples of mobile devices may include so-called smart devices, smart phones, tablet computer, notebook computer, ultra-book computer, portable game console, but also digital cameras having a transmitter for a wireless network access.

The term "wireless access point", also called "hotspot", may denote a device that may allow wireless devices to connect to a wired network using WiFi, Bluetooth or related communication technique standards. The wireless access point may usually be connected to a router (e.g., via a wired network) if it is a standalone device, or it may be part of a router itself.

The term "existing protocol" may denote a communication protocol based on a communication standard, e.g., TLS/RFC 5246 in case of a Microsoft Windows environment. Alternatives may exist for the Android operating system environments for mobile devices.

The term "password-free" may denote a mechanism in which access may be granted without requiring the manual (user) entry of a password. Manually inputting a password may always be an interrupt when establishing a network connection. Password-free may not denote that no authentication may be required. However, an authentication may be performed without user intervention in the background, such that a user may not be negatively affected by an exchange of authentication data.

The term "token-based" may—in the context of an authentication—denote an authentication that may be supported by exchanging a token or parts thereof. A token may in this context denote a digital object containing, among other things, authentication data.

The term "within reach" may denote that a distance, between two devices which may in principle communicate wirelessly, allows establishing a wireless connection.

This may require that a signal strength from one device's transmitter to the other may be strong enough for an establishment of a stable communication connection.

The term "wireless connection" may denote that two devices may have a communication link established. One device may be a mobile device while the other device may be a wireless access point, or hotspot, for WiFi access.

The term "verification server" may denote a computer having stored authentication information regarding devices that may be granted network access. The authentication information may be based on a token or parts thereof. The information being received by the verification server may be compared to a known and stored pattern. A match of both information sources, i.e., the authentication information stored and the information received, may result in the conclusion that 'this device related to the received information' is verified and access to a resource, e.g., a network may be granted.

The term "verification application" may denote a computer application running on the verification server and performing the above-mentioned matching procedure.

The term "information object" may denote data that may be sent from the wireless access point to the mobile device as part of the authentication procedure for the mobile device. The information object may comprise displayable information, e.g., a picture, or a logo, or a video to be displayed on a screen of the mobile device, or audio information to be made audio detectable, or information which may be transformed and be sensed by a user via a tactile transducer.

In the following, a detailed description of the figures will be given. All instructions in the figures are schematic. First, a block diagram of an embodiment of the inventive computer-implemented method for a password-free, token-based wireless network access is given. Afterwards, further embodiments or components thereof of the mobile device subsystem for a password-free, token-based wireless network access will be described.

Figure 1:
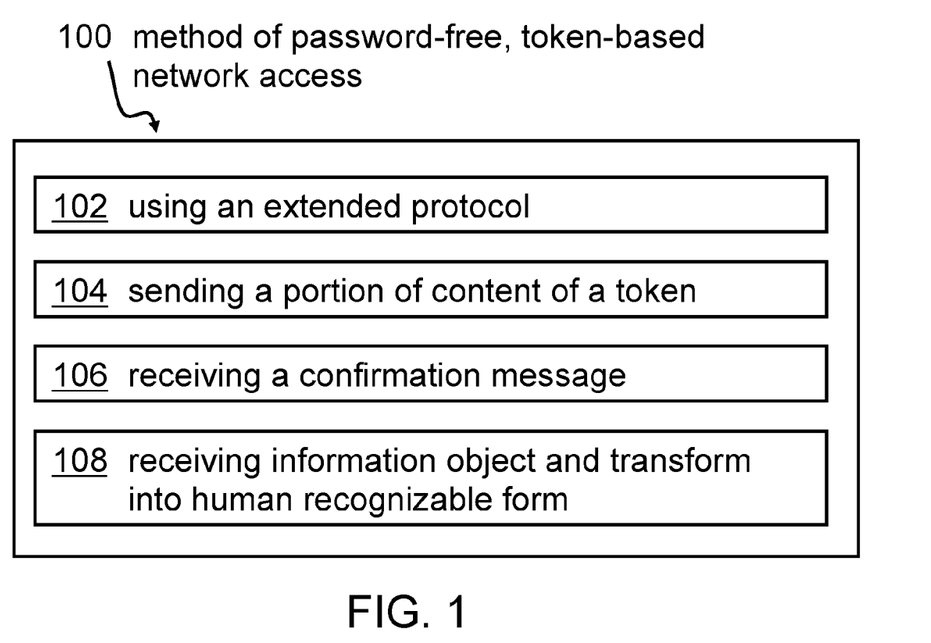
FIG. 1 shows a block diagram of an embodiment of the inventive method for a password-free, token-based wireless network access.

FIG. 1 shows a high level flow chart 100 of an embodiment of the computer-implemented method for a password-free, token-based wireless network access for a mobile device if the mobile device is within reach of a wireless access point. The method 100 may comprise using an extended existing protocol 102. The base for the wireless communication protocol may be standards based, e.g., TLS/RFC 5246, or any other protocol suited for establishing a wireless network connection between the mobile device and the wireless access point. The goal of the TLS protocol is to provide privacy and data integrity between two communicating applications. Part of it describes a handshake protocol that allows the server and client to discover each other, agree on the security and establish a secure connection before any application protocol may transmit or receive data. The extension of the existing protocol may be based on information stored as content in a data field or alternatively, several data fields in a token stored in a memory, e.g., main memory, extended memory, smart card, SIM, USB attached memory (e.g., USB stick), or other storage modules of the mobile device.

The method may also comprise sending a portion of the content of the token 104 as part of an initialization message from the mobile device. The initialization message may be receivable by a verification server connected to the wireless access point.

Furthermore, the method may comprise receiving by the mobile device a confirmation message 106 for establishing the wireless connection based on a verification application running on the verification server. The verification application may use the portion of the content of the token (e.g., an identification key)—for a generation of the confirmation message for the establishing of the wireless connection (e.g., the identification key). The method may also comprise receiving an information object 108, (e.g., a location information, a sponsor message, advertising, or the like) by the mobile device along with (i.e., together with, alongside with, combined with, or as separate message) the confirmation message. The information object may be transformed into a human recognizable form, as discussed already above.

Figure 2:
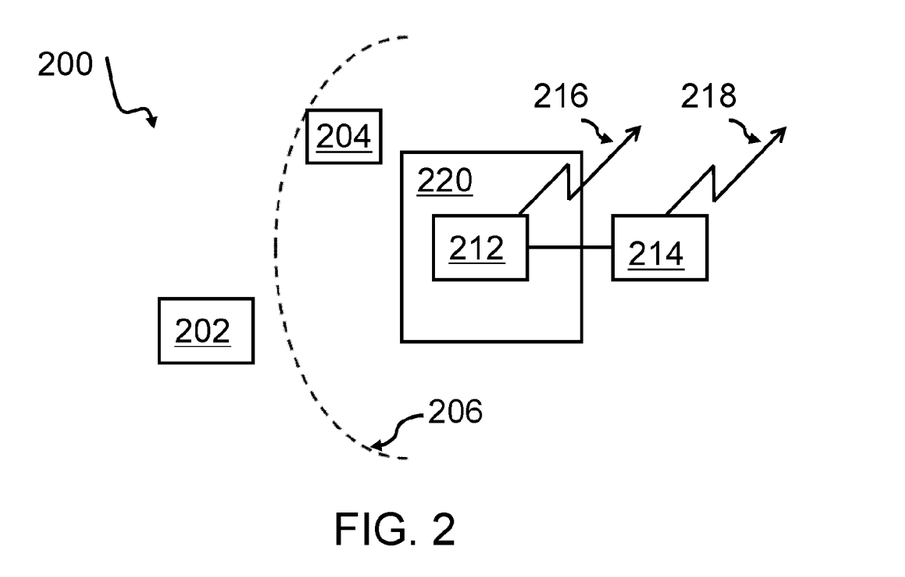
FIG. 2 shows a block diagram of a scenario of a mobile device within reach of a wireless access point.

FIG. 2 shows a block diagram 200 of a scenario of a mobile device within reach of a wireless access point. One mobile device 202 may be outside the reach—indicated by dashed line 206—of a wireless access point 212 positioned on the premises 220 of somebody wanting to allow wireless access to the Internet. Another mobile device 204 may be within reach of the wireless access point 212, meaning that within the limits of 206 a transmitter field intensity may be strong enough for establishing a wireless connection. The wireless access point 212 may be connected to a verification server 214, which may also be combined together with the wireless access point 212 to create a combined wireless access system. Access to a network, e.g., the Internet, may either be established via the combined wireless access system or just via the verification server 214, as indicated by links 216 and/or 218.

In order to further illustrate the usefulness of the proposed solution, the following scenario may be considered:

A user may leave the reach of his private home based WiFi access point for a mobile device and may prefer to use other WiFi access points over using a mobile phone network based Internet connection. When moving within the reach of other WiFi/wireless access points, for example, in the infrastructure of a commercial area, the existing wireless access points may be used by the mobile device. The incentive to provide Internet access as a service to the mobile device may be created by allowing the wireless access point in return to gather information about the device and/or the user of the device and/or displaying a message to the user of the device. Store owners may, for example, provide Internet access to customers with mobile devices in exchange for some information about the customer and the opportunity to display personalized messages on the user's mobile device. Personalized messages, for example, may include a sponsor message or direct the user to special offers that appear suitable based on the information the mobile device revealed about its owner. They may also be used to present information from loyalty programs run by the store owner. In addition, the operators of a WiFi network must ensure that users agree to some legal aspects, while accessing the Internet through their infrastructure.

Figure 3:
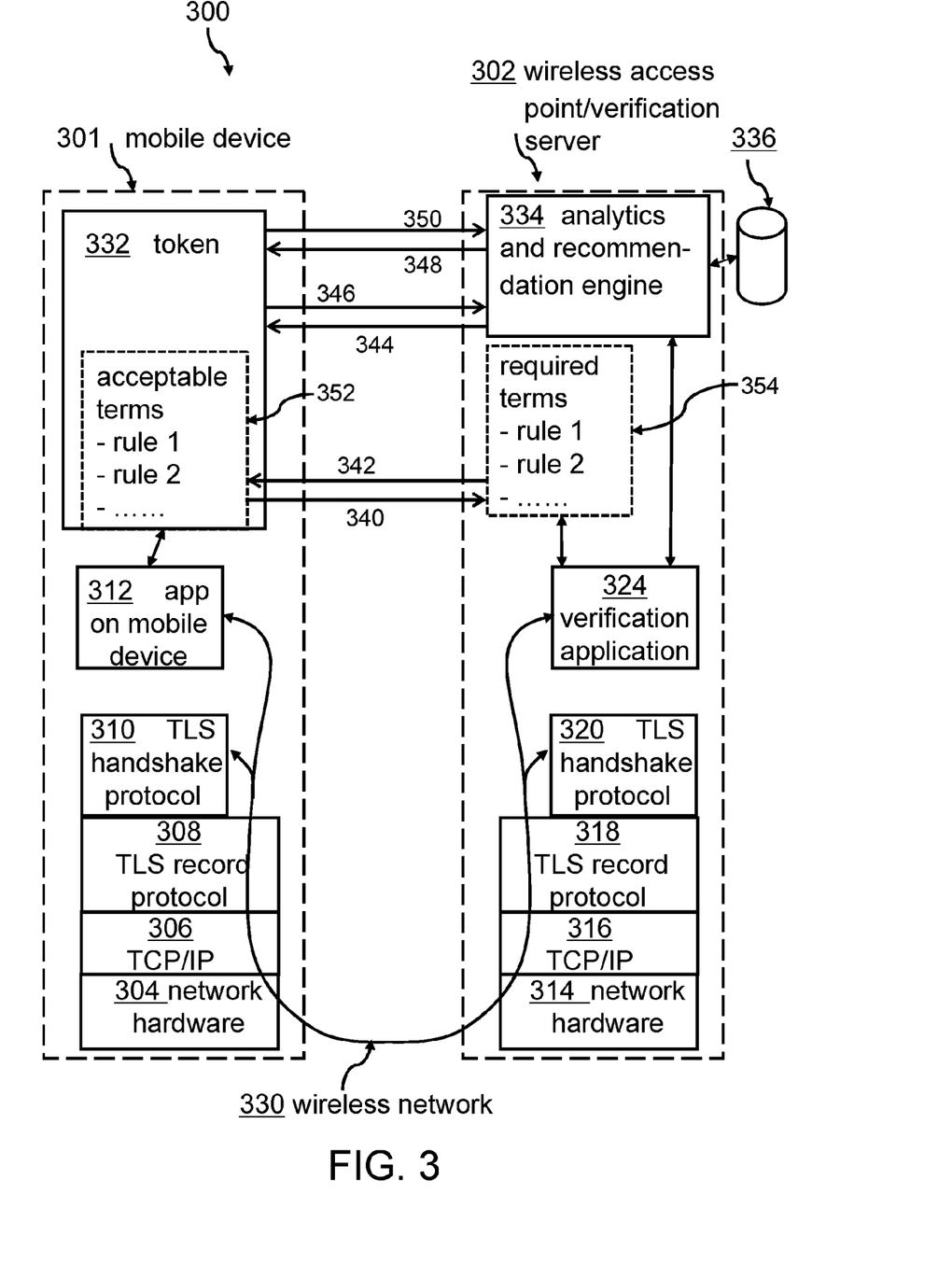
FIG. 3 shows a block diagram of an embodiment of an establishing a network connection.

FIG. 3 shows a block diagram of an embodiment of an establishment of a network connection based on, for example, the TLS protocol. The Transport Layer Security (TLS) and its predecessor, Secure Sockets Layer (SSL), are cryptographic protocols that provide communication security over the Internet. TLS and SSL encrypt the segments of network connections at an application layer for a transport layer, using asymmetric cryptography for key exchange, symmetric encryption for confidentiality, and message authentication codes for message integrity. TLS is an IETF (Internet Engineering Task Force) standards track protocol, last updated in RFC 5246, and is based on the earlier SSL specifications developed by Netscape Communications ("Netscape" is a registered trademark of AOL, Inc. in the United States and/or other countries).

In FIG. 3 the core elements of the standard TLS protocol are shown for the mobile device 301 and the wireless access point 302. Note that 302 also may refer to the verification server (compare FIG. 2, 214). Both sides comprise network hardware components 304, 314, the TCP/IP protocol component 308, 318, and the TLS handshake protocol component 310, 320. The wireless connection may be symbolized by line 330.

In addition to these standard layers, at least one additional protocol layer may be added. This may relate to the token 332 and the stored acceptable terms 352, e.g., rule 1, rule 2 . . . , and the required terms and conditions 354.

As shown, a typical dialog between the client and the server that uses the TLS protocol to establish a secure connection may be discussed. When the mobile device (or client) 301 comes into the reach of the verification server 302 and is configured to search for servers it will send a "Client Hello" message. A server receiving this hello message goes through a sequence of steps described in RFC 5246 to finally establish the means for a secure connection between client and server.

The proposed solution may extend this protocol by facilitating the available extensions in RFC 5246 to also send information about terms and conditions, or rules from the verification server 302 to the client, or mobile device 301, and to send information about the device and/or the user of the device back to the verification server 302.

According to one embodiment of this invention, this information may be embedded as an extension of the data that may be transferred by the TLS protocol. This extension may ensure that a) a token having stored terms and conditions is placed on the mobile device (or read from device if a token already exists), b) the server may provide personalized messages to the client, and c) the client may display the message and send back a confirmation that the content can be noticed by the user. Failure to receive the confirmation from the user is handled like a failure in the TLS protocol, and no connection between server and client may be established.

An identification of the mobile device 301 may be done by information stored in the token 332 which may be placed on the user's mobile device 301 upon first arrival within the range of a retail store's (or other public premises') wireless access point.

For subsequent visits (or visits at affiliated stores), this token 332 may be used to recognize the user again. The token 332 may be stored together with or as part of app 312 on mobile device 301 allowing the mobile device 301 to recognize the network and the exchanged information the next time the user is accessing it. This identification mechanism may allow exchanging strongly targeted end-user personalization and advertisement.

In an embodiment of this invention, the user of the mobile device 301 may provide some personal data, like age, gender, interests to the application which may be stored in the token 332. Some or all of that information may then be presented to the wireless access point 302, and allow the store running the wireless access point 302 to provide some targeted content especially for a group of customers the operator of the mobile device may belong to.

In some embodiments, the identity of the user may be protected by not transferring personal data, but using a unique identifier instead that may allow identification of the device as the same, but not connecting it to a particular user.

The information in the token may be updated by the application 312 each time a connection with a wireless access point 302 may be established. This way, access points have no need to store any data about the devices that are connecting to their network. By returning information about the access point to the device and storing it in the token, the device is capable of providing the history of connections to wireless access point 302. The wireless access point 302 in turn may use this to understand the user's behavior and respond with personalized content for this user. For example, frequent visitors to the vicinity of the store may receive incentives to visit the store and make a purchase. Or, with personal data about users available, the physical store may analyze the collected data and detect patterns in the behavior of customers.

It may also be possible to recognize the same user, once he may access the store's web site in the Internet using a standard access method executed on a computer. Such recognition may be made based on mapping identity information stored in the token 332 to that identity information from the store's online shop. During the next visit, the shop may recognize the user by the token 332, which may still be stored on the mobile device 301. It may also be possible to recognize the same user, once he accesses the store's web site using a standard access device like a computer. Identifying the user by a token stored on his device will allow better understanding of the user's behavior and preferences and tailoring of the offerings better to his needs.

It is also possible to link the person/device that enters the store with an actual purchase in the store, for example, by sending a coupon to each mobile device when a related user may enter the store. The coupon may be redeemed at checkout.

In order to ensure that the data provided by the mobile device to the access point are valid, a message authentication code (MAC) can be added to the message that transfers the data from the mobile device 301 to the wireless access point 302. This may be implemented in at least two ways: either through a MAC that may be calculated by the application stored on the mobile device 301 and/or with the help/use of a key that may also be stored on the mobile device 301. The wireless access point 302 may verify the received data with the help of the key that may be stored at the wireless access point 302, or on a computer connected to the access point (compare FIG. 2). This would be a preferred implementation in a 2-tier scenario.

Alternatively, the message to be transferred to the access point may be pre-computed and stored on the mobile device 301. To compute the message, a key only known by a third entity will be used. The access point cannot verify the received data itself, but sends it to the third entity in order to have it verified. It can do so immediately as part of the process that establishes the wireless communication link with the mobile device 301 or, at a later point in time. In the latter case, it could either deny or provide preliminary access for the mobile device. As soon as a verification result is available, it may store those results internally and during the next authentication process refer to those local results.

Similar to this, the access point may save the user's information based on the MAC address of the user's mobile device 301 to recognize a next visit and provide better service, coupons, or advertisement based on past visits.

Similar to this, the mobile device 301 may provide an OpenID to the access point. OpenIDs are standardized credentials, which may be used across different web sites. It may also be possible to share a common set of user preferences. By sending the OpenID to the physical store, the store may also leverage the user's preferences.

Regardless of whether a token, MAC address or OpenID may be used, this disclosure suggests ways to deliver the user's identity (based on the user's mobile device) to the physical store, which may in return offer personalized information and also map the user to the store's Internet Web Shop.

The steps described in the context of FIG. 3 may be summarized as follows: The acceptable terms and conditions 352 may be read and validated, 340, by the verification server against the required terms 354. Then network access may be granted, 342, to the mobile device 301.

An analysis and recommendation engine 334 may be responsible for writing, 344, additional data, as described above. Arrow 346 may symbolize subsequent reads of the token 332. Arrow 348 may symbolize additional data pushed from the wireless access point 302 to the mobile device 301. And the wireless access point and/or connected systems may track, 350, repetitive visits, accesses, etc. Alternatively, user data may be stored in a repository 336.

Figure 4:
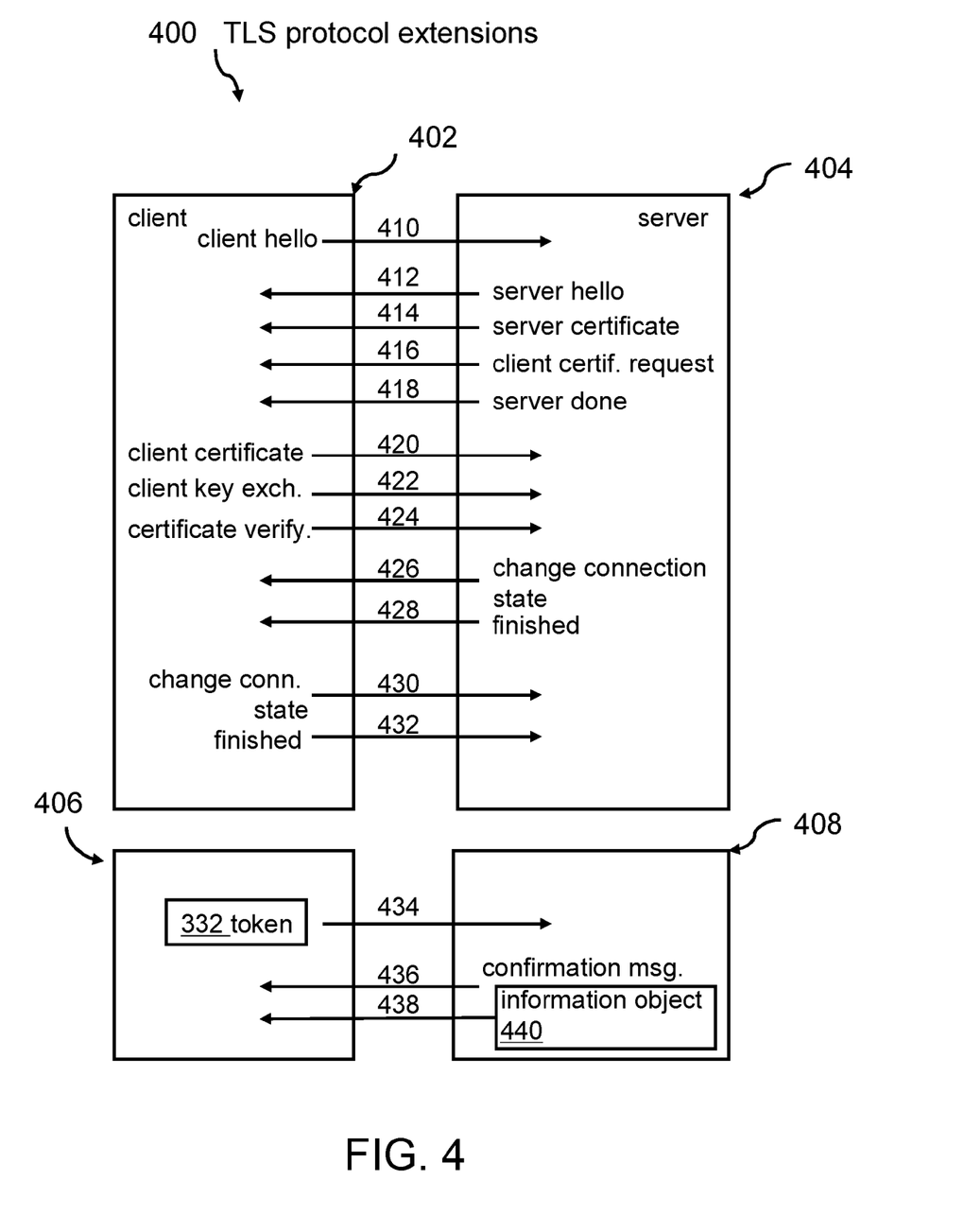
FIG. 4 shows an embodiment of an extended protocol.

FIG. 4 shows a block diagram 400 of an embodiment of an extended protocol. Blocks 402, 404 may symbolize the standard protocol whereas blocks 406, 408 may symbolize the extension to the standard protocol. Once a mobile device comes into reach of a wireless access point, it sends out, 410, a "client hello" message. The server may respond with "server hello", 412, a server certificate, 414, a client certificate request 416, and a server done message 418. The client may respond with a corresponding client certificate 420, a client key exchange 422, and a certificate verification message 424. The server side responds with a "change connection status" message 426 and a "finished" message 428. Also the client may respond with a "change connection state" message 430 and a "finished" message 432.

After that, the application on the client side takes over and sends, 434, as discussed above, the token 332 based terms and condition and other information (e.g., device capabilities) to the server. The server responds with a confirmation message 436 and sending, 438, of the information object 440.

Figure 5:
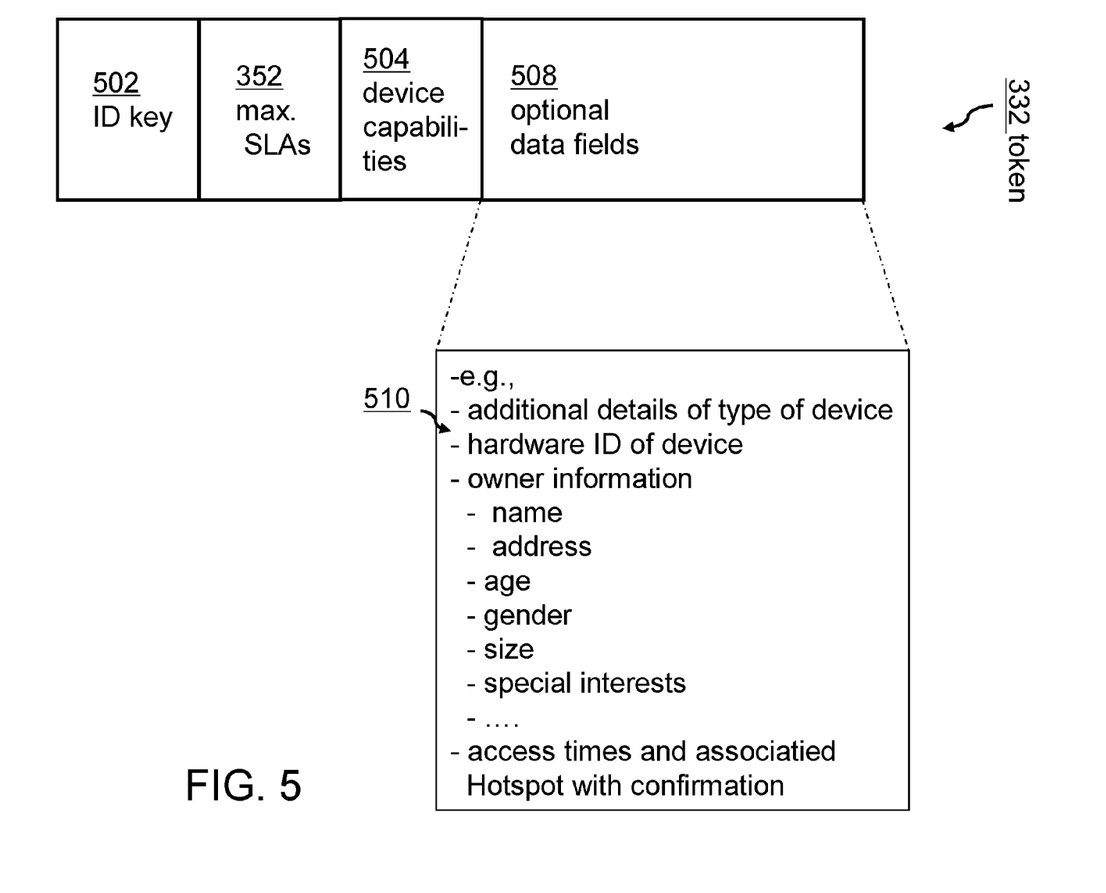
FIG. 5 shows an embodiment of a token structure.

FIG. 5 shows an embodiment of a token 332 structure. The token may comprise an ID key 502, adapted to identify the token and/or the related mobile device, as well as acceptable terms and conditions, or service level agreements 352 (compare FIG. 3) if the mobile device establishes a password-free, token-based wireless network connection. Mobile device capabilities may be stored in 504. Optional data fields 508 of the token 332 may comprise data—as outlined in 510—about a type of the device, hardware ID of the device, other capabilities of the mobile device and owner information. The owner information may be grouped into name and address of the user, gender information, age, height, size of clothes, special interests, and more. Other information stored in the token 332 may include access time to a wireless access point adapted for password-free, token-based wireless network access, location of access, and other customer relationship management data.

Figure 6:
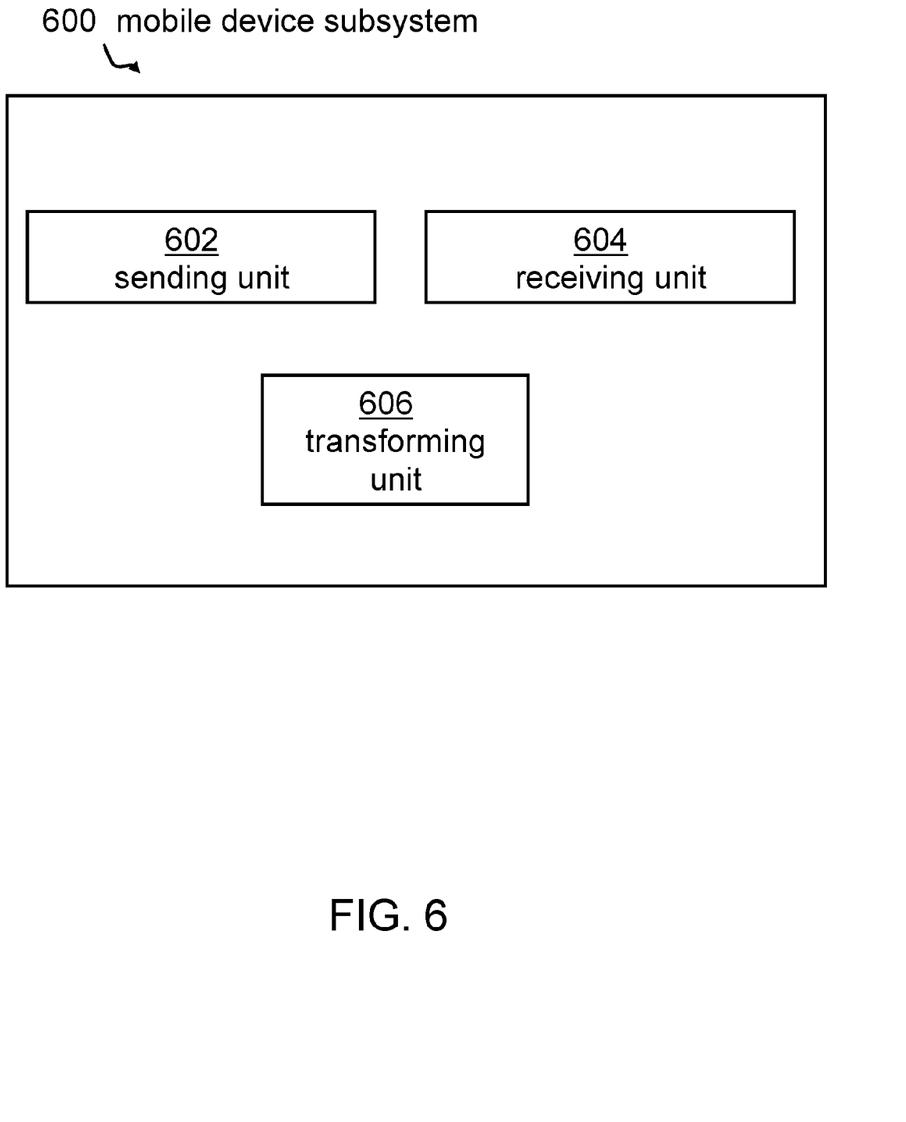
FIG. 6 shows a block diagram of an embodiment of the inventive mobile device subsystem for a password-free, token-based wireless network access.

FIG. 6 shows a block diagram of an embodiment of the inventive mobile device subsystem 600 for a password-free, token-based wireless network access. The mobile device subsystem 600 may comprise a sending unit 602 and a receiving unit 604 adapted for sending and receiving data based on WiFi signals, and a transforming unit 606 as described herein.

Figure 7:
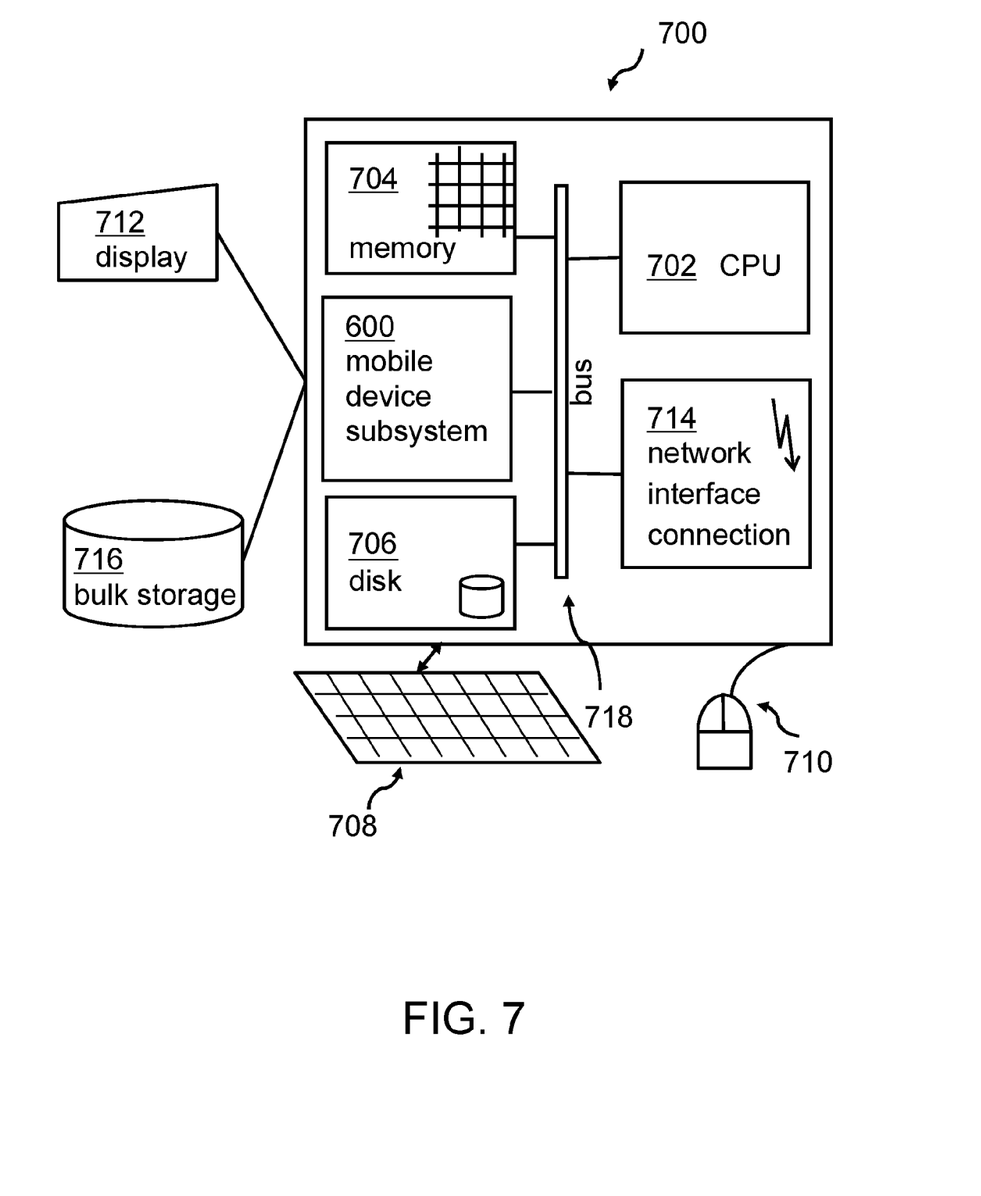
FIG. 7 shows a block diagram of an embodiment of a mobile device including the mobile device subsystem.

FIG. 7 shows a block diagram of an embodiment of a mobile device including the mobile device subsystem.

Embodiments of the invention may be implemented together with virtually any type of computer or mobile device, regardless of the platform being suitable for storing and/or executing program code. For example, as shown in FIG. 7, a computing system 700 may include one or more processor(s) 702 with one or more core(s) per processor, associated memory elements 704, an internal storage device 706 (e.g., a SIM card, a hard disk, an optical drive such as a compact disk drive or digital video disk (DVD) drive, a flash memory stick, a solid-state disk, etc.), and numerous other elements and functionalities, typical of today's computers (not shown) or mobile devices. The memory elements 704 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 716 for an execution. Elements inside the computer or mobile device 700 may be linked together by means of a bus system 718 with corresponding adapters. Additionally, a mobile device subsystem 600 for a password-free, token-based wireless network access may be attached to the bus system 718.

The computing system 700 may also include input means, such as a keyboard 708, a pointing device such as a mouse 710, or a microphone (not shown). Alternatively, the computing system may be equipped with a touch sensitive screen as a main input device. Furthermore, the computer 700 may include output means, such as a monitor or display 712 (e.g., a liquid crystal display (LCD), a plasma display, a light emitting diode display (LED, OLED), or cathode ray tube (CRT) monitor). The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those skilled in the art will appreciate that many different types of computer systems exist, and the aforementioned input and output means may take other forms. Generally speaking, the computer system 700 may include at least the minimal processing, input and/or output means, necessary to practice embodiments of the invention.

According to one embodiment of the present invention, a computer-implemented method for a password-free, token-based wireless network access for a mobile device, if the mobile device may be within reach of a wireless access point, may be provided. The method may comprise using an extended existing protocol for establishing a wireless connection between the mobile device and the wireless access point, wherein the extension of the existing protocol may be based on data, stored as content in a data field in a token stored in a memory of the mobile device. The method may also comprise sending a portion of the content of the token as part of an initialization message from the mobile device, in particular to a wireless network access point. The initialization message may be receivable by a verification server connected to the wireless access point. Furthermore, the method may comprise receiving by the mobile device a confirmation message for establishing the wireless connection based on a verification application running on the verification server, wherein the verification application may use the portion of the content of the token for a generation of the confirmation message for the establishing of the wireless connection and receiving an information object by the mobile device along with the confirmation message. The information object may be transformed into a human recognizable form.

According to another embodiment, a mobile device subsystem for a password-free, token-based wireless network access may be provided if the mobile device subsystem may be within reach of a wireless access point. An establishing of a wireless connection between the mobile device subsystem and the wireless access point may be based on an extended existing protocol. The extension of the existing protocol may be based on data, stored as content in a data field of a token, stored in the memory of the mobile device subsystem. The mobile device subsystem may comprise a sending unit adapted for sending a portion of the content of the token as part of an initialization message from the mobile device subsystem, in particular, to the wireless access point. The initialization message may be receivable by a verification server connected to the wireless access point. The mobile device subsystem may further comprise a receiving unit adapted for receiving by the mobile device subsystem a confirmation message for an establishing of the wireless connection based on a verification application running on the verification server. The verification application may use the portion of the content of the token. The receiving unit may also be adapted for receiving an information object by the mobile device subsystem as part of granting access to the network. The mobile device subsystem may also comprise a transformation unit adapted for transforming the information object into a human recognizable form.

Based on the features of the mobile device subsystem, a mobile device using the mobile device subsystem may be provided.

The proposed computer-implemented method for a password-free, token-based wireless network access may offer a couple of advantages:

The proposed method allows for a hassle free access to a wireless access point and thus to, for example, the Internet. The automated token-based authentication information exchange may allow a mobile device, once in reach of a wireless access point, to authenticate itself. This authentication may include a transmission of personal data of the owner of the mobile device stored in the mobile device. The amount of personal information to be transmitted as part of the authentication process may be controlled by a token stored in the mobile device. In this sense, the token may control a type of service level agreement or terms of condition, the user may be willing to accept, between the mobile device and a wireless access point and the related network infrastructure provider. A user may not be required to type in a user ID and password once he is in reach of a wireless access point. The connection may be established automatically if the information that a verification server may require and the information that may be transmitted via the wireless access point to the verification server may match using the extended standard protocol.

Two aspects of gaining access to a public WiFi network are combined. If the public wireless access point may be owned by a retail store, the proposed method may enable dealing with legal aspects of usage rules and an agreement to common terms of usage of the wireless network access (terms and conditions) and exposing an acceptable level of identification of the user/device to the WiFi operator, which in one embodiment, may be a store owner.

An additional advantage of the proposed solution is that for location information no GPS (Global Positioning System) information or related system may be required. As known, GPS technology in a mobile device may require a lot of battery power and also potentially long triangulation times. Moreover, GPS services are not, or seldom, available inside buildings. Thus, if the wireless access point may be, e.g., inside a shopping mall, GPS location could not be transmitted from the mobile device to the verification server. According to the proposed solution, the known location information from the wireless access point may be used instead. These are always available and it may not be a prerequisite to have GPS technology available in the mobile device, or the GPS technology may be turned off.

According to one embodiment of the method, the transformation of the information object into the human recognizable form may be performed, resulting in a displayable object, wherein the displayable object may be displayed on a screen of the mobile device as long as the wireless connection is established. In one embodiment, this may be viewed as small bar on top or bottom of the screen, as a side bar, or the like. Other details have already been discussed above. Additionally, it may be possible to transmit varying information objects to the mobile device during the established mobile connection. This way more information may be displayed from the sponsor of the wireless network access or information derived from the network connection may be used to determine additional content relevant for the user of the mobile device. In one embodiment, a displayable welcome message may be prominently displayed on the screen of the mobile device.

According to one embodiment of the method, the verification server and the wireless access point are combined into one device. This feature may allow for a low cost solution. Many wireless access points may run an operating system, e.g., Linux, thus the functionality of the verification server may be implemented within the hardware/software combination of the wireless access point. This may also have the advantage that mobile service providers may sell or give such modified wireless access point systems to legal entities that want to offer a free Internet access as part of their customer service if customers are inside or close to their shops.

According to an enhanced embodiment of the method, the content of the token may comprise at least one of a group consisting of: data about the mobile device, a specification about the information transferable from the mobile device, and an identification key unique to the mobile device. Using the identification key, a verification server may identify a specific mobile device. This may be helpful for repetitive "visits" of mobile devices to a specific wireless access point. The information about the capabilities of the mobile device to be sent as part of establishing a wireless connection may comprise screen resolution, manufacturer of the mobile device, a model number, sound capabilities, etc. Based on such information, it may be determined on the wireless access point side what kind of information object, e.g., location information or advertising, may be sent to the mobile device as part of establishing the connection between the mobile device and the wireless access point based on the extended existing protocol.

Additionally, terms and conditions data, which the user of the mobile device is willing to accept for enabling the wireless connection or service level agreement, may be transmitted during the establishing process of the wireless connection. However, it should be noted that the complete information exchange may happen without any user intervention, e.g., typing in login information and/or a password.

Thus, the acceptable terms and conditions data, in particular, need to be made available from the mobile device and need to be stored as part of the token. This may happen during a registration process, which a user may perform being outside the reach of the wireless access point, e.g., being at home at his desk. He may register himself and his mobile device for a wireless connection establishment based on the solution proposed herein if he comes together with his mobile device in reach of an enabled wireless access point in order to perform the above described method. The acceptable terms and conditions may be verified against rules of a verification application on the wireless access point side. The acceptable terms and conditions from a point of view of the user of the mobile device may comprise information about personal data, like name, address like, age, date of birth, gender, special interests and the like. The user may decide to deliver some parts of those personal data to the firm, thus allowing Internet access via wireless network access of the firm, but not other parts. The user may decide to use tokens when moving from wireless access point to wireless access point, since a token may have a different ID key from wireless access point to wireless access point.

Alternatively, a user may subscribe to the service, as discussed during his first 'being in reach'.

Therefore, according to an alternative embodiment of the method, the token being stored in the mobile device may be generated as part of a registration process between the mobile device, in particular, operated by a user, and a registration server connected to the verification server. In one embodiment, the registration server and the verification server may be the same device.

According to one enhanced embodiment of the method, as part of the registration process, a client application, e.g., a so called "app", may be downloaded to the mobile device. The client application may be adapted to perform the generation of the token, the execution of the protocol extension as well as the reception and transformation of the received information object. Alternatively, the extended protocol management may be independent of the client application and may be downloaded during registration. In that case an extended protocol management driver may be installed on the mobile device.

According to one embodiment of the method, the content of the token may be updated each time the mobile device establishes a connection to the wireless access point. Date and time of the wireless access, the location of the wireless access point, amount of data transmitted, as well as other relevant information may be stored within the token. This has the advantage that no information needs to be stored on the side of the wireless access point in the verification server or the registration server. Data privacy may be respected this way as well.

According to an alternative embodiment of the method, the verification application may receive an access clearance message, e.g., from a third party for the generation of the confirmation message from the wireless access point to the mobile device. The generation of the access clearance message may be based on a portion of the content of the token. It may happen that the access provider cannot identify the device itself and may need a third party service provider for it. Such a feature may be useful in shopping malls, where a general access may be managed for all wireless access points within the shopping mall, but it should be determinable which wireless access point may be used by the mobile device. These access points may belong to different shops inside the mall.

According to one embodiment of the method, a predefined message may be received by the mobile device as part of the information object if the mobile device did have a previous recognition by the verification server established from outside the reach of the wireless access point. Such a predefined message may be a special offer or coupon for the operator of the mobile device at the point in time the mobile device is in the vicinity of a specific wireless access point of a retail shop.

According to another embodiment of the method, at least one portion of the token and the information object are transferred via the wireless network in an encrypted form. Again, this may guarantee data privacy. No other receipt of the wireless transmitted data may be readable by unauthorized parties.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered to be disclosed within this document.

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The aspects defined above and further aspects of the present invention are apparent from the examples of embodiments to be described hereinafter and are explained with reference to the examples of embodiments, but to which the invention is not limited.

What is claimed is:

1. A method for establishing a password-free, token-based wireless network access for a mobile device, wherein the mobile device is within a wireless communication range of a wireless access point, the method comprising:
   establishing, by the mobile device, a wireless connection between the mobile device and the wireless access point, wherein the wireless connection utilizes an extended existing protocol, and wherein an extension of the existing protocol is based on data stored as content in a data field in a token stored in a memory of the mobile device;
   transmitting a portion of the content of the token as part of an initialization message from the mobile device, wherein the initialization message is transmitted to and received by a verification server that is connected to the wireless access point;
   receiving, by the mobile device, a confirmation message for establishing the wireless connection based on a verification application running on the verification server, wherein the verification application uses the portion of the content of the token for a generation of the confirmation message for the establishing of the wireless connection;
   receiving, by the mobile device, an information object and the confirmation message; and
   transforming, by the mobile device, the information object into human recognizable form.

2. The method according to claim 1, wherein the transforming the information object into the human recognizable form results in a displayable object, wherein the displayable object is displayed on a screen of the mobile device as long as the wireless connection is established.

3. The method according to claim 1, wherein the verification server and the wireless access point are combined into one device.

4. The method according to claim 1, wherein the token comprises at least one out of the group consisting of: data about capabilities of the mobile device, a specification about the information transferable from the mobile device, and an identification key unique to the mobile device.

5. The method according to claim 1, wherein the token is generated as part of a registration process between the mobile device and a registration server connected to the verification server.

6. The method according to claim 5, wherein, as part of the registration process, a client application is downloaded to the mobile device, wherein the client application is adapted to perform the generation of the token, an execution of the extension of the existing protocol, and reception and transformation of the received information object.

7. The method according to claim 1, further comprising:
   updating, by one or more processors, content of the token each time the mobile device establishes a connection to the wireless access point.

8. The method according to claim 1, wherein the verification application receives an access clearance message for the generation of the confirmation message, and wherein a generation of the access clearance message is based on the portion of the content of the token.

9. The method according to claim 1, wherein a predefined message is received by the mobile device as part of the information object if the mobile device did have a previous recognition by the verification server established from outside the reach of the wireless access point.

10. The method according to claim 1, wherein at least one portion of the token and the information object are transferred from the mobile device via a wireless network in an encrypted form.

11. The method of claim 1, wherein the extended existing protocol is an extension of a Transport Layer Security (TLS) protocol, wherein core layer elements of the TLS protocol include a network hardware component layer, a TCP/IP protocol component layer, and a TLS handshake protocol component layer, wherein the token and stored acceptable terms are added on top of the core layer elements, wherein the token includes an identification key for the mobile device, and wherein the stored acceptable terms describe personal information that a user is willing to share in order to access the wireless access point.

12. The method of claim 1, further comprising:
   transmitting, from the mobile device to the wireless access point, personal information about a user of the mobile device, wherein the personal information is transmitted in exchange for access to the wireless access point.

13. The method of claim 1, further comprising:
   in response to the mobile device first arriving within a wireless communication range of the wireless access point, receiving identification information for the mobile device from the wireless access point, wherein the identification information identifies the mobile device;
   storing the identification information in the mobile device;
   in response to the mobile device leaving and then re-entering the wireless communication range of the wireless access point, providing the identification information to the wireless access point by the mobile device;

in response to the mobile device leaving and then re-entering the wireless communication range of the wireless access point, increasing a counter of how many times the mobile device has re-entered the wireless communication range of the wireless access point; and transmitting, from the mobile device to the wireless access point, a total count of how many times the mobile device has historically re-entered the wireless communication range of the wireless access point.

14. The method of claim 1, wherein the wireless access point is physically located within a store, and wherein the method further comprises:

determining, by one or more processors, an on-line shopping history of a user of the mobile device at a web site of the store;

mapping, by one or more processors, identity information of the user stored in the token to the on-line shopping history of the user; and transmitting, from the access point to the mobile device, a tailored offer for a product within the store based on the on-line shopping history of the user.

15. The method of claim 1, further comprising:

storing, in the token, terms and conditions that are acceptable to a user of the mobile device, wherein the terms and conditions identify what personal information the user is willing to share with the wireless access point in return for access to the wireless access point;

transmitting, from the mobile device to the wireless access point, the terms and conditions that are acceptable to the user of the mobile device; and in response to the terms and conditions that are acceptable to a user of the mobile device matching required terms and conditions of the wireless access point for providing wireless access to a network, receiving authorization from the wireless access point to access the network.

16. The method of claim 1, wherein the information object provides information about a physical location of the wireless access point.

17. A mobile device subsystem for establishing a password-free, token-based wireless network access of a mobile device, wherein the mobile device is within reach of a wireless access point, wherein establishing a wireless connection between the mobile device and the wireless access point is based on an extended existing protocol, and wherein an extension of the existing protocol is based on data stored as content in a data field of a token stored in the memory of the mobile device, the mobile device subsystem comprising:

a sending unit adapted for sending a portion of the content of the token as part of an initialization message from the mobile device subsystem, the initialization message being receivable by a verification server connected to the wireless access point;

a receiving unit adapted for receiving by the mobile device subsystem, a confirmation message for an establishing of the wireless connection based on a verification application running on the verification server, wherein the verification application is using the portion of the content of the token, wherein the receiving unit is also adapted for receiving an information object, by the mobile device subsystem, as part of granting access to a network that is accessed via the wireless access point; and a transformation unit adapted for transforming the information object into a human recognizable form.

18. A computer program product for establishing a password-free, token-based wireless network access for a mobile device, wherein the mobile device is within a wireless communication range of a wireless access point, the computer program product comprising a non-transitory computer readable storage medium having program code embodied therewith, the program code readable and executable by a processor to:

establish a wireless connection between the mobile device and the wireless access point, wherein the wireless connection utilizes an extended existing protocol, and wherein an extension of the existing protocol is based on data stored as content in a data field in a token stored in a memory of the mobile device;

transmit a portion of the content of the token as part of an initialization message from the mobile device, wherein the initialization message is transmitted to and received by a verification server that is connected to the wireless access point;

receive, by the mobile device, a confirmation message for establishing the wireless connection based on a verification application running on the verification server, wherein the verification application uses the portion of the content of the token for a generation of the confirmation message for the establishing of the wireless connection;

receive, by the mobile device, an information object and the confirmation message; and transform the information object into a human recognizable form.

19. The computer program product of claim 18, wherein the transforming the information object into the human recognizable form results in a displayable object, wherein the displayable object is displayed on a screen of the mobile device as long as the wireless connection is established.

20. The computer program product of claim 18, wherein the token comprises at least one out of the group consisting of: data about capabilities of the mobile device, a specification about the information transferable from the mobile device, and an identification key unique to the mobile device.

* * * * *